United States Patent [19]

Genz et al.

[11] Patent Number: 4,954,604

[45] Date of Patent: Sep. 4, 1990

[54] PROCESS FOR THE PRODUCTION OF AROMATIC POLYETHER KETONES

[75] Inventors: Joachim Genz; Hans-Rudolf Dicke; Volker Eckhardt, all of Krefeld; Frank Kleiner, Leverkusen, all of Fed. Rep. of Germany

[73] Assignee: Bayer Aktiengesellschaft, Leverkusen, Fed. Rep. of Germany

[21] Appl. No.: 238,406

[22] Filed: Aug. 31, 1988

[30] Foreign Application Priority Data

Sep. 12, 1987 [DE] Fed. Rep. of Germany ....... 3730690

[51] Int. Cl.$^5$ .......................... C08C 8/02; C08C 8/14
[52] U.S. Cl. .................................... 528/125; 528/126; 528/128; 528/174; 528/175
[58] Field of Search ............... 528/125, 126, 128, 174, 528/175

[56] References Cited

U.S. PATENT DOCUMENTS

| | | | |
|---|---|---|---|
| 3,809,682 | 3/1974 | Studinka et al. | 528/174 |
| 4,113,699 | 4/1978 | Rose et al. | 528/126 |
| 4,638,044 | 1/1987 | Kelsey | 528/125 |
| 4,663,430 | 1/1987 | Briner et al. | 528/388 |

FOREIGN PATENT DOCUMENTS

| | | |
|---|---|---|
| 0847963 | 7/1970 | Canada . |
| 0126369 | 6/1984 | European Pat. Off. . |
| 0182648 | 5/1986 | European Pat. Off. . |
| 2220079 | 2/1972 | Fed. Rep. of Germany . |
| 2730128 | 9/1978 | Fed. Rep. of Germany . |

*Primary Examiner*—John Kight, III
*Assistant Examiner*—P. Hampton-Hightower
*Attorney, Agent, or Firm*—Connolly and Hutz

[57] ABSTRACT

The invention relates to a process for the production of high molecular weight, crystalline, aromatic polyether ketones showing high temperature stability, high resistance to the effect of chemicals and good mechanical properties.

4 Claims, No Drawings

PROCESS FOR THE PRODUCTION OF AROMATIC POLYETHER KETONES

This invention relates to a process for the production of high molecular weight, crystalline, aromatic polyether ketones showing high temperature stability, high resistance to the effect of chemicals and good mechanical properties.

Crystalline, aromatic polyether ketones are known. They may be prepared, for example, by reaction of a dialkali metal salt of a bisphenol optionally containing a keto group in the presence of an aromatic sulfone at 250° to 400° C. (U.S. Pat. No. 4,010,147). Another method is based on the reaction of a halophenol containing keto groups with an alkali metal carbonate in N-methyl pyrrolidone, an aliphatic sulfone or an aromatic sulfone at 200° to 400° C. (for example U.S. Pat. No. 4,113,699).

To produce high molecular weight, crystalline, aromatic polyether ketones, it is necessary to use a solvent although the crystalline polyether ketones produced show very poor solubility.

In the production of the polyether ketones, the solvents in which the polymerization is carried out have to show certain properties in order to obtain high yields.

Thus, where an aliphatic sulfone for example is used as solvent, undesirable gelation or discoloration of the reaction mixture is observed during the reaction because the reaction has to be sustained for a long time at very high temperatures. If benzophenones for example are used as the solvent, only oligomers can be obtained (U.S. Pat. No. 4,010,147).

Only special benzophenones, such as difluorobenzophenone, may be used for synthesis of the polymer (EP-OS 1 931 187). However, these special benzophenones are expensive and uneconomical. Hitherto, it has not been possible to use chlorinated compounds with satisfactory yields.

It has now been found that, where N-alkylated caprolactams are used as solvent in the production of crystalline, high molecular weight aromatic polyether ketones, it is also possible to use chloroketones.

The present invention relates to a process for the production of a high molecular weight, crystalline, aromatic polyether ketone from an aromatic dihydroxy compound and an aromatic dihalogen compound containing a keto group in the presence of alkali salts characterized in that N—C$_1$—C$_5$—alkyl caprolactams are used as the solvent.

The polyether ketones may be prepared, for example, by reaction of aromatic dihydroxy compounds containing free hydroxyl groups with an aromatic dihalogen keto compound in an N-alkylated caprolactam in the presence of an alkali compound (reaction type 1) or by reaction of monohydroxy mono-halogen compounds containing a free hydroxyl group in an N-alkylated caprolactam in the presence of an alkali compound (reaction type 2) or by reaction of alkali salts of aromatic dihydroxy compounds with aromatic dihalogen keto compounds in an N-alkylated caprolactam (reaction type 3) or by reaction of alkali salts of a monohydroxy monohalogen compound in an N-alkylated caprolactam (reaction type 4).

Divalent phenols corresponding to the following formula

HO—Ar—OH (I)

in which
Ar represents C$_6$-C$_{30}$ arylene,
may be used as dihydroxy compounds for the process according to the invention.

Suitable aromatic dihydroxy compounds are known and include, for example, mononuclear divalent phenols, such as hydroquinone, polynuclear dihydroxy compounds, such as 4,4'-dihydroxydiphenyl, bisphenols, such as 2,2-bis-(4-hydroxyphenyl)-propane, bis-(4-hydroxyphenyl)-methane, 4,4'-dihydroxybenzophenone, 4,4'-dihydroxy diphenyl ether, 4,4'-dihydroxy diphenyl sulfide, 1,4-bis-(4-hydroxybenzoyl)-benzene, 1,3-bis-(4-hydroxybenzoyl)-benzene and nucleus-substituted derivatives thereof, etc. They may be used either individually or in admixture.

4,4'-Dihydroxydiphenyl, 4,4'-dihydroxydiphenyl ether, hydroquinone and 4,4'-dihydroxybenzophenone are preferably used.

Aromatic dihalogen keto compounds corresponding to the following formula

X—Ar—X (III)

in which
Ar represents C$_6$—C$_{30}$ arylene containing at least one keto group and
X is halogen, such as Cl, in the ortho or para position on the last aromatic nucleus,
may be used for the process according to the invention.

Preferred dihalogen keto compounds correspond to formula (III), (IV) or (V) below:

(III)

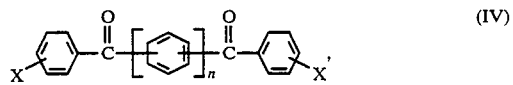

(IV)

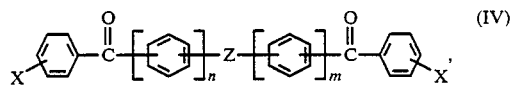

(IV)

in which
X has the meaning defined for formula (II),
Z is an ether group, a thioether group, a carbonyl group or a sulfone group and
m and n each have a value of 1, 2, or 3.

Aromatic dihalogen keto compounds suitable for use in accordance with the invention are dihalogen chlorocompounds, for example 4,4'-dichlorobenzophenone, 2,4'-dichlorobenzophenone, bis-1,4-(4-chlorobenzoyl)-benzene, bis-1,3-(4-chlorobenzoyl)-benzene, bis-4,4'-(4-chlorobenzoyl)-biphenyl and bis-4,4'-(4-chlorobenzoyl)-diphenyl ether, etc. The dihalogen keto compounds may be used either individually or in admixture.

The dihalogen keto compounds of formula (II) preferably have a chlorine atom in the para position on the last aromatic nucleus.

Chlorine-substituted aromatic dihalogen keto compounds are considerably less expensive than the difluoro compounds otherwise used, but are still sufficiently reactive under the reaction conditions according to the invention.

Particularly suitable aromatic dihalogen keto compounds are 4,4'-dichlorobenzophenone and bis-1,4-(4-chlorobenzoyl)-benzene.

Monohydroxy monohalogen compounds suitable for use in accordance with the invention correspond to the following formula

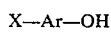  (VI)

in which

X is halogen, such as Cl,

X and OH are in the ortho or para position at the last aromatic radical and

Ar has the meaning defined for formula (II).

Instead of using the compounds containing free hydroxyl groups, it is also possible to use the alkali salts (Li, Na, K salts) of the corresponding compounds.

Preferred monohydroxy monohalogen compounds are, for example, 4-chloro-4'-hydroxybenzophenone, 4-(4-chlorobenzoyl)-4'-hydroxybiphenyl, 4-(4-chlorobenzoyl)-4'-hydroxydiphenyl ether, 4-chloro-4''-hydroxyterephthalophenone and 4-chloro-4'-hydroxyisophthalophenone, etc. and alkali metal salts thereof.

The monohydroxy monohalogen compounds may be used individually or in admixture.

Their alkali metal salts may be obtained by standard methods, for example by reaction of the hydroxyl compounds with alkali metal hydroxides, such as LiOH, NaOH, KOH.

The preferred monohydroxy monohalogen compound is 4-chloro-4'-hydroxybenzophenone or an alkali salt thereof (Na, K salt).

Preferred solvents for the process according to the invention are N-methyl caprolactam, N-ethyl caprolactam, N-n-propyl caprolactam and N-isopropyl caprolactam, N-methyl caprolactam being particularly preferred.

The particular advantage of the solvents used in accordance with the invention is that they are liquid at room temperature and have a very high boiling point and are thermally stable and strongly polar.

The solvents used in accordance with the invention may be used either individually or in admixture. They may also be used in admixture with hitherto known solvents, such as diphenyl sulfone or benzophenone.

Alkali metal salts suitable for use in accordance with the invention are the alkali metal salts of the compounds corresponding to formulae (1) and (VI) and, for example, alkali hydroxides, carbonates, bicarbonates, fluorides, hydrides, alkoxides (for example methylates, ethylates and alkylates (for example butyls, ethyls), preferably the carbonates and bicarbonates of potassium. Where monohydroxy monohalogen compounds of formula (VI) are used in the form of alkali salts in the process according to the invention, there is no need for alkali salts to be added.

The process according to the invention may be carried out as follows:

The reaction components are dissolved in the solvent in the presence of the alkali metal compound and the reaction mixture is gradually heated to around 120° to 200° C.

The water of reaction formed is removed at that temperature by an added azeotropic entraining agent, after which the azeotropic entraining agent is distilled off by increasing the temperature and, finally, the reaction mixture is heated to reaction temperatures of 200° to 400° C. and kept at that level for 0.1 to 24 hours and preferably from 0.5 to 4 hours. To obtain high molecular weights, the aromatic dihydroxy compounds and the aromatic dihalogen compounds are reacted with one another in substantially equimolar quantities.

In order, where required, to obtain relatively low molecular weights, it is best to use one of the reaction components in excess.

Where alkali salts have to be added, approximately 1.0–1.2 mol alkali salts are added per val hydroxyl groups.

The azeotropic entraining agent used may be a compound which forms an azeoptrope with water and which has a lower boiling point than the solvent according to the invention, for example benzene, toluene and xylene, preferably toluene.

According to the invention, the reaction is carried out at a temperature of 180° to 400° C. and preferably at a temperature of 200° to 280° C.

Crystalline, aromatic polyether ketones having molecular weights of 1000 to 500,000 ($M_w$) and a relative viscosity of 0.5, as measured in sulfuric acid, are obtained in accordance with the invention. They are insoluble in the usual solvents and show outstanding thermal stability and resistance to chemicals and excellent mechanical properties. They may be used for the production of molded articles, films, fibers or surface coatings, etc. They may be mixed and processed with other polymers and blended with fillers, such as glass fibers, carbon fibers, aramide fibers, calcium carbonate, calcium silicate, and standard additives, such as stabilizers, pigments, mold release agents.

EXAMPLES

General Procedure

Reaction type 1:

1.0 mol 4,4'-dichlorobenzophenone, 1.0 mol of the aromatic dihydroxy compound, 1200 ml N-methyl caprolactam, 360 ml toluene and 1.2 mol $K_2CO_3$ are introduced into a 3000 ml three-necked round-bottomed flask equipped with a glass stirrer and a water separator with reflux condenser and thermometer. The reaction mixture is heated with stirring until the water of reaction formed is completely removed at an internal temperature of 200° C. (1 to 5 hours). After removal of the water of reaction, the reaction mixture is heated to around 230° C. and stirred for another 90 minutes.

To coagulate the polymer formed, the reaction mixture is precipitated while still hot in a 10% aqueous phosphoric acid solution, the polymer precipitated in the form of a powder is filtrated off and then repeatedly suspended in water until it is free from electrolyte. To remove any residual solvent still present, the product is then thoroughly boiled with methanol, filtered and dried. The yield comprises more than 93% of the theoretical.

The relative viscosity of the dried product is determined in 100% sulfuric acid at a concentration of 1 g/100 ml.

The crystallite melting point and the associated enthalpy of fusion were determined as a function of the degree of crystallization using a Mettler TA 3000 differential scanning calorimeter.

Reaction type 2:

2.0 mol aromatic monohydroxy monohalogen keto compound, 1200 ml N-methyl caprolactam, 360 ml toluene and 1.2 mol $K_2CO_3$ are introduced into a 3000 ml three-necked round-bottomed flask provided with a glass stirrer, water separator with reflux condenser and thermometer. The reaction takes place similarly to reaction type 1.

Reaction types 3 and 4:

Instead of the reaction components for reaction types 1 and 2, the corresponding alkali metal salts (potassium phenolates) are initially introduced into the reaction vessel in place of the compounds containing free hydroxyl groups. The reaction takes place similarly to reaction type 1.

The polymers produced are shown in Table 1.

3. A process as claimed in claim 1, characterized in that aromatic dihalogen keto compounds corresponding to the following formula $$X—Ar—X \quad (II)$$

in which
Ar represents $C_6$–$C_{30}$ arylene containing at least one keto group and
X represents Cl in the ortho or para position on the last aromatic nucleus,

TABLE 1

| Example No. | Reaction components | Polymer structure formed | Rel. viscosity | Mp. (°C.) | Fusion enthalpy J/g | Color of product |
|---|---|---|---|---|---|---|
| 1. | 4,4'-dichlorobenzophenone, hydroquinone | 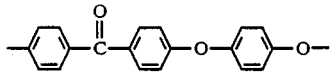 | 0.599 | 338 | 67 | light beige |
| 2. | 4,4'-dichlorobenzobenzophenone 4,4'-dihydroxydiphenyl | 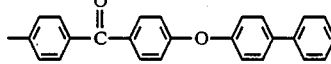 | 0.509 | 391 | 109 | beige |
| 3. | 4,4'-dichlorobenzophenone 4,4'-dihydroxydiphenyl ether | 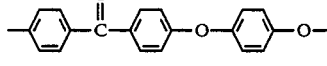 | 0.806 | 324 | 67 | yellow ochre |
| 4. | 4,4'-dichlorobenzophenone 4,4'-dihydroxybenzophenone | 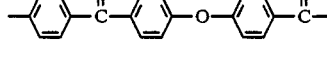 | 0.532 | 375 | 113 | white |
| 5. | 4-chloro-4'-hydroxybenzophenone |  | 0.924 | 365 | 114 | yellow |
| 6. | 4-chloro-4'-hydroxybenzophenone, potassium salt |  | 1.281 | 366 | 114 | beige |
| 7. | 4,4'-dichlorobenzophenone hydroquinone potassium salt |  | 0.603 | 340 | 69 | beige |

We claim:

1. A process for the production of a high molecular weight, crystalline, aromatic polyether ketone from an aromatic dihydroxy compound and an aromatic dihalogen compound containing a keto group in the presence of alkali salts, characterized in that N—$C_1$—$C_5$—alkyl caprolactams are used as the solvent.

2. A process as claimed in claim 1, characterized in that divalent phenols corresponding to the following formula $$HO—Ar—OH \quad (I)$$

in which
Ar represents $C_6$–$C_{30}$ arylene,
are used as the dihydroxy compounds.

are used.

4. A process for the production of a high molecular weight, crystalline, aromatic polyether ketone from aromatic monohydroxy monohalogen compounds corresponding to the formula $$X—Ar—OH$$

or alkali metal salts thereof
in which
X represents halogen,
X and OH are in the ortho or para position at the last aromatic nucleus, and
Ar represents $C_6$–$C_{30}$ arylene containing at least one keto group, in the presence of alkali salts, characterized in that N—$C_1$—$C_5$-alkyl caprolactams are used as the solvent.

* * * * *